United States Patent [19]

Bean

[11] 4,087,687
[45] May 2, 1978

[54] TEMPERATURE CONTROL DEVICE

[75] Inventor: Gerald T. Bean, Springfield, Va.

[73] Assignee: The United States of America as represented by the Secretary of the Army, Washington, D.C.

[21] Appl. No.: 763,760

[22] Filed: Jan. 28, 1977

[51] Int. Cl.² ........................ G02F 1/13; H01J 31/50
[52] U.S. Cl. .................................. 250/331; 250/352
[58] Field of Search ............................... 250/331, 352

[56] References Cited

U.S. PATENT DOCUMENTS 3,770,961  11/1973  Westell .............................. 250/331

Primary Examiner—Archie R. Borchelt
Attorney, Agent, or Firm—Nathan Edelberg; John E. Holford; Robert P. Gibson

[57] ABSTRACT

The invention is a temperature stabilizing device employing a liquid crystal wherein the crystal is itself stabilized to provide a thermal viewing element.

9 Claims, 1 Drawing Figure

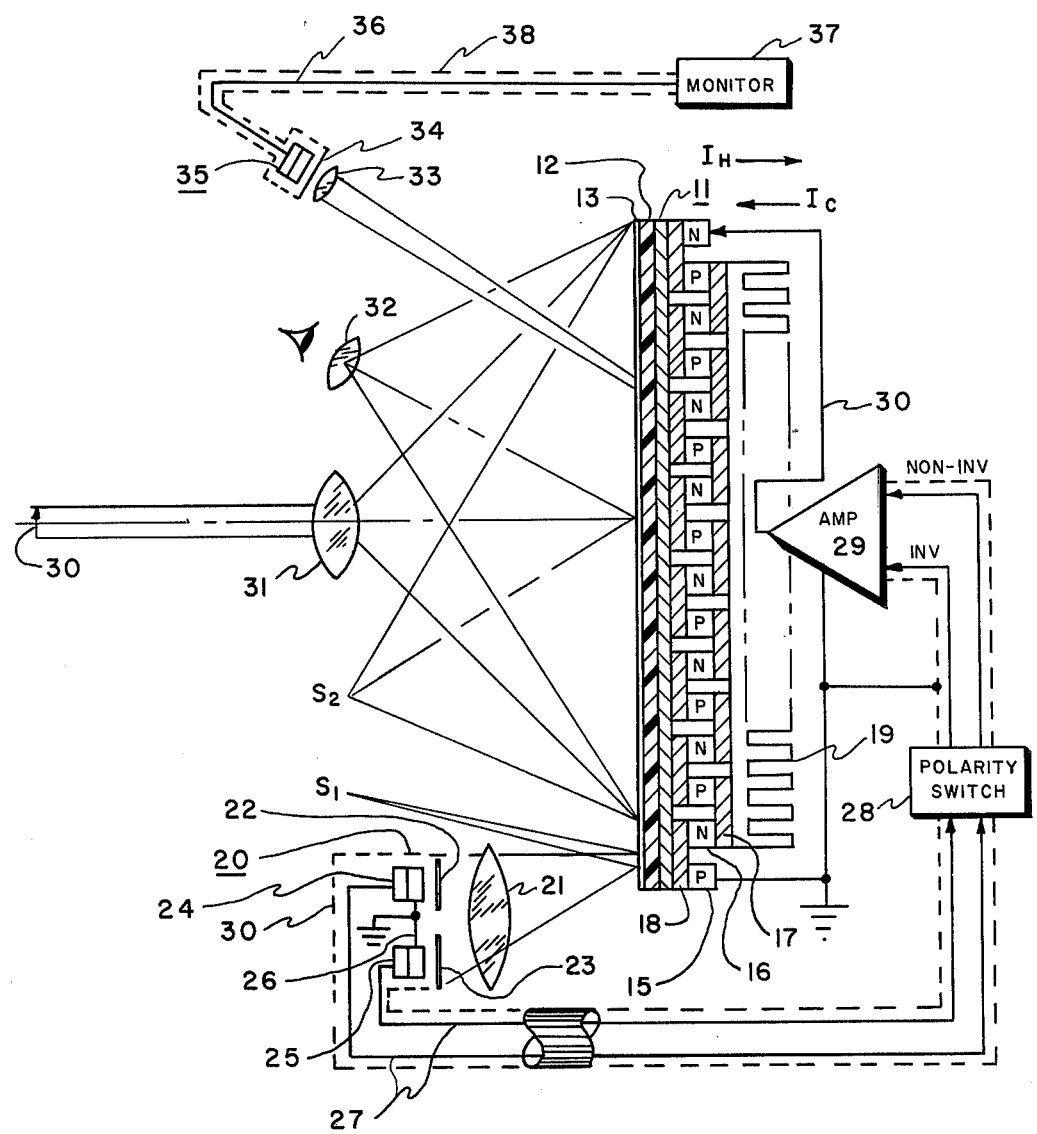

TEMPERATURE CONTROL DEVICE

The invention described herein may be manufactured, used, and licensed by the U.S. Government for governmental purposes without the payment of any royalties thereon.

BACKGROUND OF THE INVENTION

A class of compounds commonly referred to as liquid crystals have been extensively exploited as display devices, particularly in electronic calculators. Over a given temperature range such compounds exhibit rheological properties similar to fluids and optical properties similar to crystals. This condition has been referred to as a separate state of matter called the mesomorphic state or mesophase. If a source of white light is directed on the surface of a thin layer of one of these crystals the scattering properties are such that only a narrow band of frequencies (colors) are reflected from its surface. The center frequency of this band is directly proportional to temperature. The color changes are most easily observed when the back of the thin crystal is coated with a black or light absorbing layer.

The compounds themselves are almost exclusively derivatives of cholesteral or cholestryl esters. Some of these are described in more detail in U.S. Pat. No. 3,620,889 entitled "Liquid Crystal System" granted to Donald H. Baltzer, Nov. 16, 1971. The patent also teaches how to form mixtures of these compounds, so that the temperature range of operation can be centered at various values including normal room temperature (about 25° C). The patent also discloses the use of carbon particles in the crystal to improve color visibility in situations where the use of a black background is not feasible.

It has been suggested that such a crystal be used to detect infrared (thermal) images. To be effective in this role its temperature would have to be held constant to a small fraction of a degree in spite of ambient temperature changes and the radiation load that the crystal would carry. Systems to do this tend to be expensive and bulky. To compete with existing solid state systems a unique approach to these problems is needed.

BRIEF DESCRIPTION OF THE INVENTION

The present invention uses the optical properties of a liquid crystal to control its own temperature or the temperature of an object to which it is thermally coupled. The invention further contemplates the use of the temperature stabilized crystal in a thermal viewing system and in an unmanned automatic alarm system.

BRIEF DESCRIPTION OF THE DRAWINGS

The invention is best understood with reference to the attached drawing which shows a preferred embodiment of complete thermal viewing system with an auxiliary alarm circuit for unmanned operation.

DESCRIPTION OF THE PREFERRED EMBODIMENT

Referring to the drawing FIGURE a thermal viewing element 11 and its control circuit is shown. Layer 13 is a liquid crystal which can be a coating or a liquid encapsulated in the manner described in the Baltzer patent. The crystal is attached by an intermediate layer 12 to the transfer plate of Peltier type heater-cooler. The transfer plate 14 consists of a good thermal and electrical conductor such as aluminum, copper, silver or gold. The intermediate layer may be an adhesive material such as epoxy or suitable adhesives may be applied to its surfaces. The intermediate layer is also preferably black to provide a good optical background for the crystal. It must be a good thermal conductor and be sufficiently resilient to absorb any stains due to differential thermal expansion of the crystal and transfer plate. When the crystal is applied as a coating the intermediate layer may also have to be a chemical buffer to protect the transfer plate from the solvent in the crystal structure.

The Peltier heater-cooler is a commercially available device. It consists of a plurality of modules each including a pair semiconductor elements 15 and 16 doped to provide $n$ and $p$ type conductivities, respectively. These elements are connected in an alternating series by means of highly conductive plates 17 and 18 with every other plate being coplanar at opposite surfaces of the cooler. When current is passed through the elements and plates heat is transferred from each plate having an $n$ type element at its input to the plates having a $p$ type input. Thus the current flowing in the direction $I_C$ cools the plates 18 contacting transfer plate 14 and the current $I_H$ heats them. A heat sink 19 is attached to plates 17 to remove or supply heat required for transfer. These devices can, as an example, produce ninety or more degrees of temperature difference using 30 pairs of semiconductors subjected to 5 watts of heat load. With a thirty ampere input one couple or pair can transfer about 8 btu's (2 watts) per hour. This is more than sufficient for the present applications.

If the crystal is illuminated by a broadband source of light such as white light, the crystal will reflect a narrow band of frequencies beginning with red light at the lowest temperature in the mesophase and progressing through the spectrum to violet light at the highest temperature. The reflected light is focussed on a detector 20 by means of suitable optics 21 which may be associated with either the source or the detector. In the detector the light is divided into two substantially equal parts by a pair of filters 22 and 23 which pass only mutually exclusive adjacent frequency bands of color. The filters may be a high pass and a low pass type with the same cutoff frequency, or steep skirted band pass filters, if faster corrections are desired. A photodetector such as element 24 or 25 is placed behind each filter. The pass bands are selected so that both detectors receive equal amounts of radiation when the crystal is at the desired temperature. The detectors can be designed to generate signals of opposite polarity or the same polarity at the input of a balanced amplifier 29. In the latter case the signals are applied to separate inverting and non-inverting inputs, respectively. When separate inputs are used a polarity reversing switch 28 may be inserted in series with the leads 27 which carry these signals to the amplifier, to reverse the input connections in the event that the leads are misconnected. Since the detector signals are low level, it is preferred that the detectors and leads be surrounded by a shielding conductor 30. The detectors are also preferably belanced to ground through lead 26. The output of the balanced amplifier 29 drives the Peltier heater-cooler. As the temperature of the transfer plate and liquid crystal drift from the selected temperature one or the other of the detectors receive a greater amount of radiation from the crystal and cause a current to flow through the Peltier heater-cooler in the direction required to bring the crystal and plate to the selected temperature. Instead of the transfer plate, the wall of any object requiring temperature regulation can be substituted.

When used as an infrared viewer it is only important that the transfer plate itself remain at constant temperature, preferably near the lowest temperatures in the mesophase of the crystal. The infrared radiation from a distant source 30 is then projected through suitable optics onto the crystal surface. This radiation preferably falls in the band of wavelengths from 3 to 15 micrometers which passes readily through germanium lens systems that are opaque to visible light. The radiation from source $S_1$, in this embodiment is confined to a small area at the edge of the crystal not subjected to the infrared image. The IR image produces small instantaneous temperature variations across the crystal which can be made visible by projecting uniform white light from a source $S_2$ over the area containing the IR image. Suitable optics 32 may be provided to aid the viewer's eyes. The sources $S_1$ and $S_2$ can be completely separate or merely different beams of a single source.

In certain surveillance applicators there may be sufficient information on targets within the infrared image to permit unmanned operation. For instance, if a fixed scene is being observed on the chance that a very hot target such as a vehicle will enter, the current to the Peltier unit will settle down to a small oscillation. When such a target appears there may be sudden large current which can be detected by a monitor to operate an alarm. A better method, however, is to provide a separate detector. A lens system 33 focuses the visible light from a particular area of the image through a filter 34 to the detector 35. The filter passes light reflected at the crystal temperature produced by the target and rejects that reflected at the normal scene temperature. The detector signal is transmitted via the lead 36 to a monitor or alarm 37. Lead 38 is preferably shielded as discussed previously. This method has several advantages over monitoring the current of Peltier unit. First, the detector makes use of any preknowledge of the expected position of the target such as a road or waterway in the image, thereby insuring a greater response to the target. Additionally, several detectors and monitors using band pass filters can be used to police a number of areas in the image and provide individual responses to each. By using different band pass filters it is also possible to identify different targets, even at the same locations.

Where severe ambient temperatures are encountered it may be necessary to provide a constant source of heating or cooling to bring the temperature of the transfer plate within the operating range of the Peltier unit, but this will occur only rarely. A finned heat sink 19 attached to the back of the unit is generally all that is needed, perhaps aided by a fan (not shown) to speed heat transfer.

I claim:
1. A thermal viewing system comprising:
a layer of liquid crystal having first and second mutually exclusive portions which reflect a characteristic color of light for each of a plurality of temperature increments within a given temperature range;
a heat sink;
a heat transfer plate attached to said layer;
a reversible heat transfer means connected between said sink and said plate to change the temperature of said plate in response to an input electrical signal;

infrared focussing means coupled with said layer to project an infrared image only on said first portion thereof;
a source of visible light coupled with and illuminating said first portion and said second portion whereby said infrared image is rendered visible when said transfer plate is maintained at fixed temperature within said given temperature range; and
a first optical detector means electrically coupled to said heat transfer means to detect color changes only in said second portion of said crystal layer and to generate said electrical input signal in inverse proportion thereto whereby equal and opposite temperature changes are induced in said transfer plate.

2. A thermal viewer according to claim 1 wherein said source of visible light comprises:
a first light source illuminating said first portion only; and
a second light source illuminating said second portion only.

3. A thermal viewer according to claim 1 further comprising:
monitor circuit means coupled with said crystal layer to detect and compare changes in temperature of said first portion with the small oscillations produced by said heat transfer means and to operate an alarm when comparatively large changes are detected.

4. A thermal viewer according to claim 3 wherein:
said monitor is electrically connected between said first optical detector and said heat transfer means to detect temperature changes as a function of said input electrical signal.

5. A thermal viewer according to claim 4 wherein:
said monitor means includes a second optical detector coupled to said first portion of said crystal layer, said second detector being sensitive only to a specific range of colored light reflected by said layer said range lying outside the normal range of oscillations produced by said heat transfer means.

6. A thermal viewer according to claim 5 wherein:
said second optical detector is coupled to said crystal layer to receive light from a smaller portion only of said first portion.

7. A thermal viewer according to claim 6 wherein:
said monitor means includes a plurality of said additional detectors, each additional detector coupled to the light reflected from a different smaller portion only of said first portion of said crystal layer.

8. A thermal viewer according to claim 6 wherein:
said monitor means includes a plurality of additional detectors coupled to the light reflected from a same smaller portion of said first portion, each additional detector being sensitive to different color of light.

9. The method of operating an infrared viewer wherein a liquid crystal layer is mounted on a plate which maintained at constant temperature while an infrared image and a uniform flux of visible light are projected on said layer simultaneously comprising the steps of:
detecting the color of light samples reflected by said crystal over an area independent of said infrared image; and
adjusting the temperature of said plate to keep the color of said samples substantially constant.

* * * * *